United States Patent [19]

Kellet et al.

[11]  4,357,167
[45]  Nov. 2, 1982

[54] METHODS OF STOWING CAVITIES WITH FLOWABLE MATERIALS

[75] Inventors: William H. Kellet, Coalville; Peter S. Mills, Burton-on-Trent, both of England

[73] Assignee: Coal Industry (Patents) Limited, London, England

[21] Appl. No.: 180,565

[22] Filed: Aug. 25, 1980

[30] Foreign Application Priority Data

Sep. 7, 1979 [GB] United Kingdom ................. 7931203
Nov. 16, 1979 [GB] United Kingdom ................. 7939750

[51] Int. Cl.³ ............................................. C04B 7/02
[52] U.S. Cl. ...................................... 106/97; 106/104; 106/109; 106/DIG. 4
[58] Field of Search ................. 106/104, 109, DIG. 4, 106/97

[56] References Cited

U.S. PATENT DOCUMENTS 2,516,342  7/1950  Randall .......................... 106/DIG. 4
3,973,978  8/1976  Nakagawa et al. ................. 106/104
4,095,988  6/1978  Jancek et al. .......................... 106/97
4,216,022  8/1980  Wilson .................................. 106/104

Primary Examiner—James Poer
Attorney, Agent, or Firm—Stevens, Davis, Miller & Mosher

[57] ABSTRACT

A quick setting cementitious composition with good early strength characteristics contains, by volume, 1–30% of a cement mixture including Portland Cement, calcium aluminate and calcium sulphate, 0.001–5% of clay and water in excess of 65%. The composition is especially suited for filling cavities in underground mines, for the construction of roadside packs, and the various components of the composition can be separately pumped or otherwise conveyed to the cavity.

27 Claims, No Drawings

METHODS OF STOWING CAVITIES WITH FLOWABLE MATERIALS

This invention relates to the stowing of cavities with flowable materials.

In particular, although not exclusively, the present invention relates to the stowing of cavities in an underground mine, the cavities being at least partly filled with flowable, setable material.

It is conventional practice in an underground coal mine to provide a number of service roadways leading to a longwall coal face and for each roadway to be progressively extended in order to maintain contact with the advancing coal face. Typically, each roadway is extended by excavating rock strata immediately above a portion of the void left behind the advancing coal face and formed by extraction of the coal. The rock boundary exposed by the newly excavated section of the roadway is contained by yieldable roof supports set at spaced intervals along the roadway and by cladding arranged over the roadway roof supports.

In order to help support the rock strata adjacent to the roadway it is usual to stow or infill portions, usually in stepwise units, either side of the roadway with loose small pieces of rock or mineral usually produced by the excavation of the roadway, or with timber blocks or with a concrete like material composed of a mixture of mine rock and cement. Such stowing or infilling is commonly known as packing and each infilling unit is called a pack.

The material from which the packs are composed has to provide sufficient strength to support the adjacent mine strata within a desired maximum interval of time after the pack is built or formed. As the advancing face is not permitted to advance by more than a distance prescribed by law beyond the support roadway, the desired maximum interval of time is dependent upon the desired rate of advance of the coal face and therefore, it should be as short as is practically possible. This particularly is the case with modern longwall face installation where relatively rapid rates of face advance are essential in order to justify the high capital outlay on equipping the longwall coal face.

An object of the present invention is to provide a method of packing an underground mine void which tends to permit relatively rapid face advance to be achieved.

Accordingly, the present invention provides a method of stowing or filling a cavity with a flowable cavity filling medium wherein the cavity filling medium comprises, by volume, 1–30% cement mixture, 0.001–5% clay and water in excess of 65%, the cement mixture comprising Portland Cement and, based on the weight of Portland Cement, 10–75% of a mixture of calcium aluminate and calcium sulphate, 0.5–15% of at least one inorganic salt and 0.005–3% of an organic or inorganic setting retarder.

The invention also includes the hardenable flowable cavity filling medium as defined above.

Typically, the mixture of calcium aluminate and calcium sulphate is in a ratio by weight of from 3:1 to 1:3. Calcium aluminate materials usable in the mixture can be selected from one or more of the following 3 CaO·Al$_2$O$_3$, 12 CaO·7Al$_2$O$_3$, CaO·Al$_2$O$_3$, CaO·2Al$_2$O$_3$ and 3 CaO·3Al$_2$O$_3$. The calcium aluminate materials are suitably in crystalline form.

CaO·Al$_2$O$_3$ is normally preferred because of its ready availability as High Alumina Cement.

Examples of suitable Portland Cement include Ordinary Portland Cement, Rapid Hardening Portland Cement and Sulphate Resistant Portland Cement.

The calcium sulphate may be selected from one or more of dihydrate, hemihydrate and anhydrites. Anhydrous calcium sulphate is preferably mixed with CaO·Al$_2$O$_3$ in a ratio by weight of from 10:8 to 10:12.

Suitable organic setting retarders are carboxylic acids, hydroxycarboxylic acids and the salts thereof, including one or more of the following, malonic acid, succinic acid, malic acid, citric acid, tartaric acid, gluconic acid and alkali metal or alkaline earth metal salts thereof. Alkali metal and alkaline earth metals include sodium, potassium, magnesium and calcium. Usually the preferred salts are those of hydroxycarboxylic acids. The amount of acid or salt is preferably from 0.02 to 3% by weight of the cement.

Suitable inorganic salts usable in the cement mixture include one or more halides, sulphates, nitrites, nitrates, borates, carbonates and hydroxides, carbonates usually being preferred. Examples of suitable inorganic salts include aluminium chloride, calcium chloride, magnesium bromide, potassium sulphate, sodium nitrate, potassium nitrate, calcium borate, sodium carbonate, potassium bicarbonate and sodium hydroxide. The inorganic salt acts as a cement accelerator.

Typically, the clay comprises one or more of the following, hectorites, bentonites, smectite or kaolinite clays. Usually bentonite clays are preferred; suitably the proportion of bentonite to water in the clay is 0.25–10% by weight. The presence of a colloidal clay slurry impedes the separation of the cement from the water when the cement and clay slurries are mixed, the presence of the clay tending to keep the cement particles in suspension. However, it has been determined that the clay accelerates the setting of the cement, improving the performance of the inorganic salt accelerator, assisting the desired early roof support requirement of the packs when formed. The presence of the clay confers a degree of plasticity to the hardened pack, thus preventing brittle failure when the pack is subjected to substantial forces from the supported rock strata. Hence a pack formed by a method in accordance with the present invention tends to reduce damage to the adjacent mine roadway. In addition, as the packs tend to be maintained in a whole condition air leakage through the pack tends to be reduced. Air leakage is an important factor in encouraging heating or spontaneous combustion in underground coal mines.

The working time of the cement usually is controlled by the addition of hydroxycarboxylic retarder. The working time is the interval of time taken from the mixing of the slurries before the cement hardens sufficiently to impair pumpability. Further workability, ie increase in the working time, can be obtained by the addition of surface active agents, for example, calcium lignosulphonate. The working time of the cement must be adequate to permit the cement slurry to be pumped along the associated feed pipe and through the mixer unit into the pack hole before hardening significantly impedes flow.

In a typical example, the quick setting cement reacts with water to form large crystals of Ettringite, $$6CaO·Al_2O_3·3SO_3·32H_2O.$$

Advantageously, at least two supply lines are provided for feeding fluids towards the cavity.

Preferably, one pipe line feeds a slurry containing cement mixture towards the cavity and the other pipe line feeds a slurry containing clay towards the cavity.

Alternatively, one pipe line feeds a slurry containing Portland Cement towards the cavity and the other pipe feeds a slurry containing clay and the inorganic salt.

Alternatively, at least one of the constituents is pneumatically transported along one of the pipe lines. Advantageously, a blend of cement mixture and clay is pneumatically transported along one pipe line towards the cavity and water is fed towards the cavity along another pipe line.

Alternatively, one pipe line feeds a cement/clay slurry mixture towards the cavity and the other pipe line feeds a slurry or solution of inorganic salt towards the cavity.

It will be seen that, advantageously, the various components of the medium are separately supplied towards the cavity to be filled thus avoiding any substantial length of pipework containing the quick setting medium. Severe problems have been caused in the past in underground mining where a hold-up in the advance of the face has caused cement mixes to set solid in the supply pipes.

The present invention also provides within its scope a method of stowing a cavity to form a pack in an underground mine.

By way of example only, five embodiments of carrying out the method according to the present invention will be described.

In the first embodiment according to the present invention a quick setting cement slurry and a clay slurry are pumped along two separate feed pipe lines from a relatively remote pump or feed station to a pack hole or pack site the outer side boundaries of which are defined by a portable boundary wall assembly extending vertically between the mine floor and the mine roof (ie portable shuttering.) The pack site or pack hole is located in a portion of the void left behind an advancing longwall coal face and adjacent to a service roadway linking the coal face to the pit bottom and thus to the service mine shafts or drifts. The pack when formed tends to help to support rock strata adjacent to the roadway.

In other installations the pack site or pack hole is located along the coal face remote from a service roadway.

Adjacent to the pack site the two slurry feed pipes are fed into a common mixer unit including an outlet nozzle for directing the mixed medium into the pack hole. A third feed pipe may be provided for feeding water to the mixer unit.

The medium is pumped into the pack hole until the pack extends to the boundaries defined by the boundary wall assembly and extends from the mine floor to adjacent the mine roof. Once completed the pack is left to set before the portable boundary wall assembly is removed and advanced to the next pack site. The setting time is dependent upon the constituents of the cement slurry, and can be adjusted as required according to experimental work.

The constituency and the feed rates of the pumped cement and clay slurries is such that the cavity filling medium includes a mixture of cement, clay and water in the following proportions by volume, cement mixture 1-30% clay 0.001-5% and water 65-98.9%.

In this first embodiment of the present invention the cement slurry comprises water and cement mixed in a ratio of 0.5:1 to 2:1 by weight. The clay slurry comprises bentonite mixed with water, the bentonite being between 0.25% and 10% by weight of the slurry. Typically, the medium stowed into the pack hole comprises cement mixture, bentonite and water substantially in the proportions 14%, 1% and 85% by volume. These proportions are obtained by mixing the quick setting cement slurry to a water/cement ratio of 0.8 to 1 by weight with substantially an equal volume of 3% by weight bentonite/water slurry. The resultant mixture enables the portable boundary wall assembly to be removed within about 15 minutes of the pack being formed at a temperature of around 20° C.

In the above example the quick setting cement mixture comprised the following:

65.35% Ordinary Portland Cement
18% High Alumina Cement
14% Anhydrous Calcium Sulphate
2.4% Sodium Carbonate
0.25% Citric Acid The above is mixed with water in a water/cement ratio of 0.8 to 1.

In the mixer unit an equal volume of bentonite water slurry comprising 1 to 3% by weight of bentonite, is mixed with the cement slurry.

In a second embodiment of the method in accordance with the present invention, dry cement material is pneumatically transported to the pack site, the cement being mixed with water and clay slurry in the mixer unit before being stowed into the pack hole.

In a third embodiment of the method in accordance with the present invention, dry clay material is blended with dry cement material and the blended mixture is pneumatically transported to the pack site where it is mixed with water in the mixer unit immediately prior to it being stowed into the pack hole. In carrying out this third embodiment, excess of water may be required.

In the fourth embodiment of the present invention, a cement slurry and a clay plus inorganic salt (cement accelerator) slurry are pumped along two separate feed lines from a relatively remote pump or feed station to a packhole or pack site the outer side boundaries of which are defined by a portable boundary wall assembly extending vertically between the mine floor and mine roof or a suitable container. The pack site or pack hole is located in a portion of the void left behind an advancing longwall coal face and adjacent to a service roadway linking the coal face to the pit bottom and thereby the service mine shafts or drifts. The pack when formed tends to help to support rock strata adjacent to the roadway.

In other installations the pack site or pack hole is located along the coal face remote from a service roadway.

Adjacent to the pack site the two slurry feed pipes are fed into a common mixer unit including an outlet nozzle for directing the mixed medium into the pack hole. A third feed pipe may be provided for feeding water to the mixer unit.

The medium is pumped into the pack hole until the pack extends to the boundaries defined by the boundary wall assembly and extends from the mine floor to adjacent the mine roof. Once completed the pack is left to set before the portable boundary wall assembly is removed and advanced to the next pack site.

The constituency and the feed rates of the pumped cement and clay plus cement accelerator slurries is such that the cavity filling medium includes cement mixture, clay and water in the following proportions by volume, cement 1–30%, clay 0.001–5% and water 65–98.9%.

Typically the cement comprises a Portland Cement and by weight of Portland Cement, 10–75% of a mixture of calcium aluminate material and calcium sulphate material, and 0.05–3% of at least one of the following compounds, a carboxylic acid, a hydroxycarboxylic acid or a salt of either said acids or an inorganic retarder.

In this fourth embodiment, the cement slurry comprises water and cement mixed in a ratio of 0.5:1 to 2:1 by weight. The clay plus inorganic cement accelerator slurry comprises bentonite and sodium carbonate mixed with water. The bentonite is present in an amount of between 0.25% and 10% by weight of water and the sodium carbonate calculated as being between 1% and 10% by weight of the cement in the cement slurry. Typically, the medium stowed into the pack hole comprises a mixture of cement mixture, bentonite and water substantially in the proportions 14%, 1% and 85% by volume. These proportions are obtained by mixing in a mixer unit the cement slurry to a water/cement ratio of 0.8 to 1 by weight with substantially an equal volume of a slurry comprising a mixture of 3% by weight bentonite/water slurry and 4%, by weight, of the cement in the cement slurry, of sodium carbonate inorganic cement accelerator. The resultant mixture enables the portable boundary wall assembly to be removed within about 15 minutes of the pack being formed at a temperature of around 20° C.

In the above example the cement comprised the following:
66.65% Ordinary Portland Cement
18.4% High Alumina Cement
14.7% Anhydrous Calcium Sulphate
0.25% Citric Acid.

The above is mixed with water in a water/cement ratio of 0.8 to 1.

In a fifth embodiment of the method in accordance with the present invention, dry clay material is blended with dry cement material and the blended mixture mixed with water and pumped to the pack site, where it is mixed with a slurry or solution of inorganic salt cement accelerator immediately prior to it being stowed into the pack hole.

In order embodiments of the present invention the mixer unit is disposed with, the stowing medium being mixed in the pack hole.

It is foreseen that use of the present invention is not restricted to pack forming in underground mines; it is envisaged that the present invention could find use wherever it is desired to stow or fill a cavity with a quick setting cementitious mixture having good early strength characteristics.

The present invention utilises a flowable cavity filling medium, which, primarily because of its high content of water, is relatively inexpensive compared to known flowable media. It offers a reliable method which is free of many of the materials handling problems which are encountered with known methods, and practical work underground has shown excellent results.

What we claim is:

1. A method of stowing or filling a cavity with a flowable cementitious cavity filling medium, comprising filling the cavity with a flowable cavity filling medium wherein the medium comprises, by volume, cement mixture 1–30%, 0.001–5% of at least one clay selected from the group consisting of hectorite, bentonite, smectite and kaolinite clays and water in excess of 65%, the cement mixture comprising Portland Cement and, based on the weight of Portland Cement, 10–75% of a mixture of calcium aluminate and calcium sulphate, 0.5–15% of at least one inorganic salt accelerator and 0.005–3% of an organic or inorganic setting retarder and permitting the medium to harden in situ to form a supportive mass.

2. A method according to claim 1, wherein the clay comprises bentonite.

3. A method according to claim 2, wherein the proportion of clay to water is 0.25–10% by weight.

4. A method according to claim 1, wherein the mixture of calcium aluminate and calcium sulphate is in a ratio by weight of from 3:1 to 1:3.

5. A method according to claim 1, wherein the calcium aluminate is High Alumina Cement.

6. A method according to claim 5, wherein anhydrous calcium sulphate is present with High Alumina Cement in a ratio by weight of from 10:8 to 10:12.

7. A method according to claim 1, wherein an organic setting retarder is used which is a carboxylic acid, hydroxycarboxylic acid or salt thereof.

8. A method accordng to claim 1, wherein the inorganic salt is a halide, sulphate, nitrite, nitrate, borate, carbonate or hydroxide.

9. A method according to claim 8, wherein the salt is sodium or potassium carbonate.

10. A method according to claim 1, wherein Ordinary Portland Cement is used.

11. A method according to claim 1, wherein a slurry containing cement mixture and a slurry containing clay are separately fed towards the cavity.

12. A method according to claim 11, wherein the two slurries are mixed in a mixer unit before being used to fill the cavity.

13. A method according to claim 1, wherein a slurry containing Portland Cement and a slurry containing clay and the inorganic salt accelerator are separately fed towards the cavity.

14. A method according to claim 1, wherein a blend of cement mixture and clay is pneumatically transported towards the cavity, and water is separately fed towards the cavity.

15. A method according to claim 1, wherein a slurry containing Portland Cement and clay and a solution of inorganic salt accelerator are fed separately towards the cavity.

16. A method according to claim 1, wherein the cavity is at least partially defined by shuttering.

17. A method according to claim 16, comprising the successive filling of packs at the side of a roadway in an underground mine.

18. A hardenable cementitious cavity filling medium comprising by volume, 1–30% cement mixture, 0.001–5% of at least one clay selected from the group consisting of hectorite, bentonite, smectite and kaolinite clays and water in excess of 65%, the cement mixture comprising Portland Cement and, based on the weight of Portland Cement, 10–75% of a mixture of calcium aluminate and calcium sulphate, 0.5–15% of at least one inorganic salt accelerator and 0.005–3% of an organic or inorganic setting retarder.

19. A hardenable medium according to claim 18, wherein the clay comprises bentonite.

20. A hardenable medium according to claim 19, wherein the proportion of clay to water is 0.25–10% by weight.

21. A hardenable medium according to claims 18, 19 or 20, wherein the mixture of calcium aluminate and calcium sulphate is in a ratio by weight of from 3:1 to 1:3.

22. A hardenable medium according to claim 18, wherein the calcium aluminate is High Alumina Cement.

23. A hardenable medium according to claim 22, wherein anhydrous calcium sulphate is present with High Alumina Cement in a ratio by weight of from 10:8 to 10:12.

24. A hardenable medium according to claim 18, wherein an organic setting retarder is used which is a carboxylic acid, hydroxycarboxylic acid or salt thereof.

25. A hardenable medium according to claim 18, wherein the inorganic salt is a halide, sulphate, nitrite, nitrate, borate, carbonate or hydroxide.

26. A hardenable medium according to claim 25, wherein the salt is sodium or potassium carbonate.

27. A hardenable medium according to claim 18, wherein Ordinary Portland Cement is used.

* * * * *